US011901132B2

(12) United States Patent
Ryu et al.

(10) Patent No.: US 11,901,132 B2
(45) Date of Patent: Feb. 13, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventors: Minoru Ryu, Takasaki (JP); Yoshiki Iwazaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/745,194

(22) Filed: May 16, 2022

(65) Prior Publication Data
US 2022/0392708 A1 Dec. 8, 2022

(30) Foreign Application Priority Data

May 27, 2021 (JP) .................................. 2021-089488
Oct. 21, 2021 (JP) .................................. 2021-172541

(51) Int. Cl.
| | |
|---|---|
| *H01G 4/30* | (2006.01) |
| *H01G 4/12* | (2006.01) |
| *C04B 35/64* | (2006.01) |
| *H01G 4/008* | (2006.01) |

(Continued)

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1227* (2013.01)

(58) Field of Classification Search
CPC .... C04B 35/4682; C04B 35/64; H01G 4/008; H01G 4/012; H01G 4/1227; H01G 4/30
See application file for complete search history.

(56) References Cited

U.S. PATENT DOCUMENTS

| | | |
|---|---|---|
| 2018/0090271 A1 | 3/2018 | Ito et al. |
| 2019/0362895 A1 | 11/2019 | Kobayashi et al. |
| 2020/0357573 A1 | 11/2020 | Morita |

FOREIGN PATENT DOCUMENTS

| | | |
|---|---|---|
| JP | H10330160 A | 12/1998 |
| JP | 2011079720 A | 4/2011 |
| JP | 2018060999 A | 4/2018 |

(Continued)

OTHER PUBLICATIONS

Drazic et al., Direct Visualization of Polar Nanoregions in BaTiO3-based Ferroelectrics Above Curie Temperature, Microscopy and Microanalysis 25 (Suppl. 2), Aug. 2019, pp. 1910-1911, Microscopy Society of America. (2 pages).

(Continued)

*Primary Examiner* — Nathan Milakovich
(74) *Attorney, Agent, or Firm* — Law Office of Katsuhiro Arai

(57) ABSTRACT

A ceramic electronic device includes a multilayer structure in which each of a plurality of dielectric layers and each of a plurality of internal electrode layers are alternately stacked, a main component of the plurality of dielectric layers being a ceramic having a perovskite structure expressed by a general formula $ABO_3$. At least one of crystal grains of the plurality of dielectric layers has a core-shell structure. A dispersion of atomic displacement amounts between B site atoms and oxygen atoms of a shell of the core-shell structure is larger than a dispersion of atomic displacement amounts between B site atoms and oxygen atoms of a core of the core-shell structure.

33 Claims, 10 Drawing Sheets

(51) Int. Cl.
C04B 35/468 (2006.01)
H01G 4/012 (2006.01)

(56) References Cited

FOREIGN PATENT DOCUMENTS

JP    2019204836 A    11/2019
JP    2020184587 A    11/2020

OTHER PUBLICATIONS

Ryu et al., Analysis of Atomic Displacement of Core-Shell Dielectric Materials for MLCCs by Atomic Resolution STEM, Preliminary Draft for the 38th Meeting on Ferroelectric Materials and Their Applications (FMA38). (2 pages).

Zhu et al., Atomic scale investigation of enhanced ferroelectricity in (Ba, Ca)TiO3, RSC Advances, Apr. 2017, pp. 22578-22586, vol. 7, Royal Society of Chemistry. (5 pages).

● : A SITE ATOM (41)
● : B SITE ATOM (42)
• : OXYGEN ATOM (43)

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-89488, filed on May 27, 2021 and the prior Japanese Patent Application No. 2021-172541, filed on Oct. 21, 2021, the entire contents of which are incorporated herein by reference.

FIELD

A certain aspect of the present disclosure relates to a ceramic electronic device and a manufacturing method of the ceramic electronic device.

BACKGROUND

Recently, downsizing of electronic devices is requested because electronic circuits used for digital electronic devices such as mobile phones or tablet terminals are highly densified. Therefore, downsizing and enlarging of capacity of ceramic electronic devices such as multilayer ceramic capacitors structuring the circuits are rapidly promoted. In the electronic devices, ceramic having a perovskite structure is used for dielectric layers in order to achieve high electrostatic capacity. And a metal such as a base metal is used for internal electrode layers in order to reduce cost. In order to fire the ceramic and nickel together with each other without oxidation of the metal, the ceramic electronic device is fired in a reductive atmosphere. However, an oxygen vacancy formed in the ceramic in the firing process in the reductive atmosphere degrades a lifetime in a high-temperature load test. From a viewpoint of reducing the amount of the oxygen vacancy, it is favorable that a re-oxidation process at a low temperature in an oxidizing atmosphere in which the metal is hardly oxidized is performed, after the firing in the reductive atmosphere.

From a viewpoint of high insulation characteristic of the dielectric layers in a strong reductive atmosphere, there is a method in which manganese is solid-solved in a core and a shell of a core-shell structure (for example, see Japanese Patent Application Publication No. 10-330160). There is a method for improving a lifetime by decreasing the amount of oxygen vacancy which moves over crystal boundary in the dielectric layers (for example, see Japanese Patent Application Publication No. 2020-184587).

SUMMARY OF THE INVENTION

According to a first aspect of the embodiments, there is provided a ceramic electronic device including: a multilayer structure in which each of a plurality of dielectric layers and each of a plurality of internal electrode layers are alternately stacked, a main component of the plurality of dielectric layers being a ceramic having a perovskite structure expressed by a general formula $ABO_3$, wherein at least one of crystal grains of the plurality of dielectric layers has a core-shell structure, wherein a dispersion of atomic displacement amounts between B site atoms and oxygen atoms of a shell of the core-shell structure is larger than a dispersion of atomic displacement amounts between B site atoms and oxygen atoms of a core of the core-shell structure.

According to a second aspect of the embodiments, there is provided a ceramic electronic device including: a multilayer structure in which each of a plurality of dielectric layers and each of a plurality of internal electrode layers are alternately stacked, a main component of the plurality of dielectric layers being a ceramic having a perovskite structure expressed by a general formula $ABO_3$, wherein at least one of crystal grains of the plurality of dielectric layers has a core-shell structure, wherein a direction of atomic displacement between B site atoms and oxygen atoms of a shell of the core-shell structure is different from a direction of atomic displacement between B site atoms and oxygen atoms of a core of the core-shell structure.

According to a third aspect of the embodiments, there is provided a manufacturing method of a ceramic electronic device including: forming a ceramic multilayer structure by stacking a plurality of stack units, each of which has a structure in which an internal electrode pattern is formed on a dielectric green sheet including ceramic raw material powder having a perovskite structure expressed by a general formula $ABO_3$, the ceramic raw material powder being subjected to a ball milling in acetic acid aqueous solution; and firing the ceramic multilayer structure, wherein a dispersion of atomic displacement amounts between B site atoms and oxygen atoms of a shell of a crystal grain having a core-shell structure included in a dielectric layer obtained from the dielectric green sheet is larger than a dispersion of atomic displacement amounts between B site atoms and oxygen atoms of a core of the core-shell structure.

According to a fourth aspect of the embodiments, there is provided a manufacturing method of a ceramic electronic device including: forming a ceramic multilayer structure by stacking a plurality of stack units, each of which has a structure in which an internal electrode pattern is formed on a dielectric green sheet including ceramic raw material powder having a perovskite structure expressed by a general formula $ABO_3$, the ceramic raw material powder being subjected to a ball milling in acetic acid aqueous solution; forming a fired structure by firing the ceramic multilayer structure; and pressing the fired structure and performing a thermal treatment of the fired structure so that a direction of atomic displacement between B site atoms and oxygen atoms of a shell of a crystal grain having a core-shell structure included in a dielectric layer obtained from the dielectric green sheet is different from a direction of atomic displacement between B site atoms and oxygen atoms of a core of the core-shell structure.

DETAILED DESCRIPTION

Reduction of the thickness of internal electrode layers and external electrodes is requested in order to downsize the ceramic electronic devices and enlarge the capacity of the ceramic electronic devices. When the electrodes are thinned, ESR may be degraded because of increasing of the resistance of the electrodes caused by slight oxidation of a surface of the electrodes in the re-oxidation process. Accordingly, it is favorable that the ceramic electronic devices are fired in a strong reductive atmosphere in which the internal electrode layers and the external electrodes are not oxidized. However, when the ceramic electronic devices are fired in the strong reductive atmosphere, a lot of oxygen vacancies are formed in the dielectric layers. In particular, the oxygen vacancies are left in the core of which a concentration of an additive is low, after the re-oxidation process. Therefore, the lifetime is reduced.

Hereinafter, an exemplary embodiment will be described with reference to the accompanying drawings.

EXEMPLARY EMBODIMENT

First Embodiment

Figure 1:
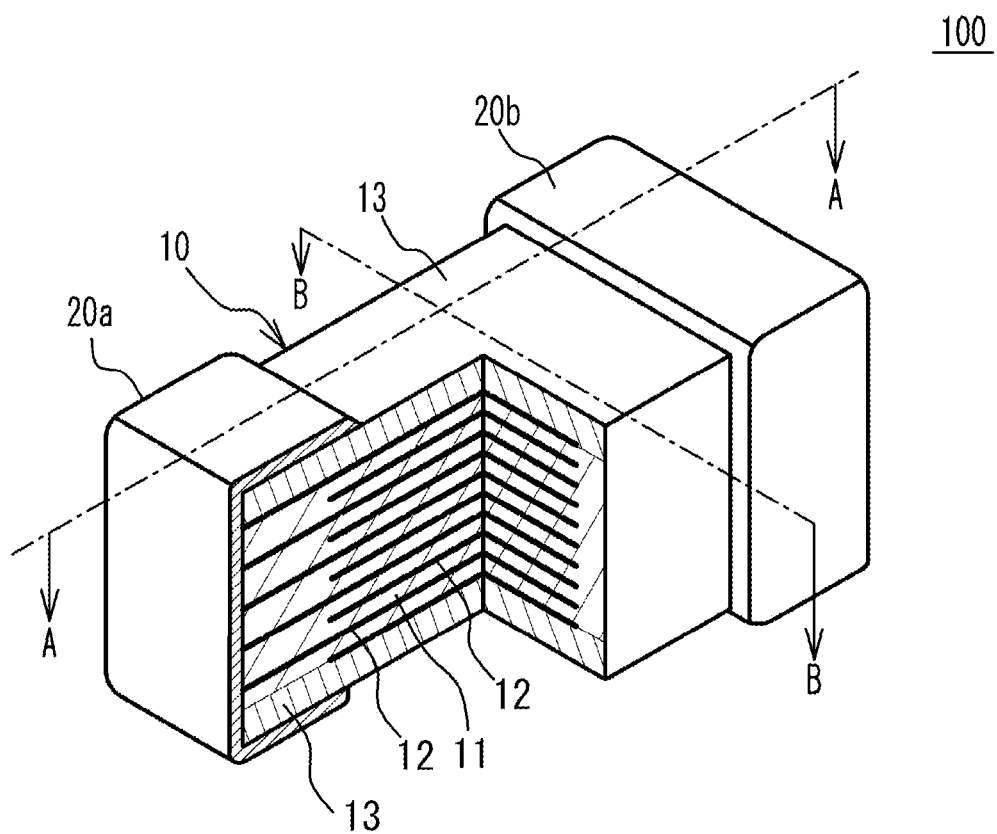
FIG. 1 is a partial cross-sectional perspective view of a multilayer ceramic capacitor.
Figure 2:
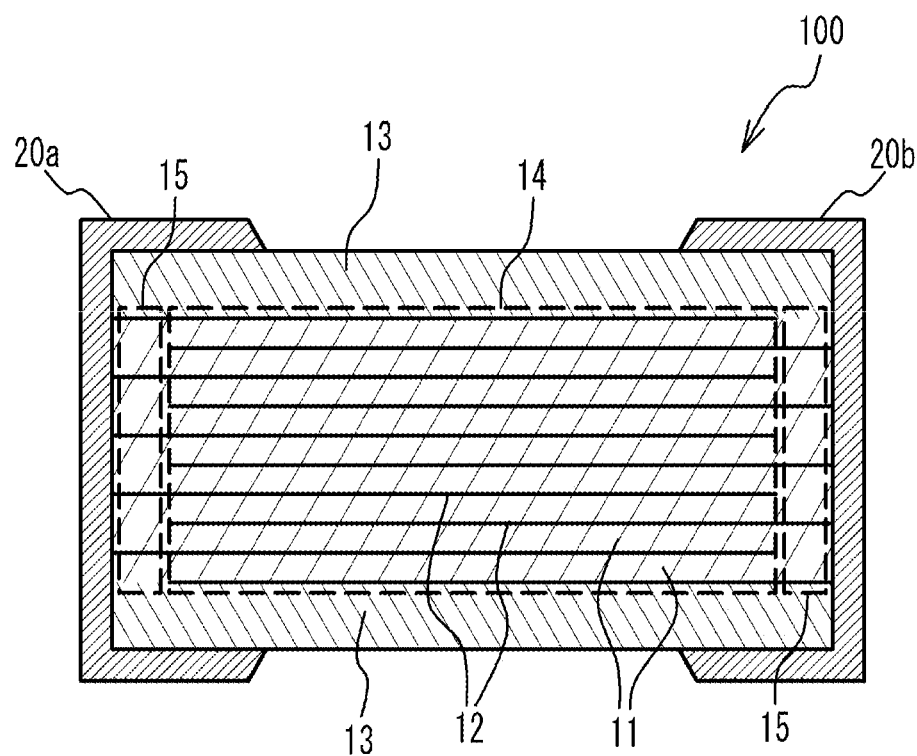
FIG. 2 is a cross-sectional view taken along line A-A in FIG. 1.
Figure 3:
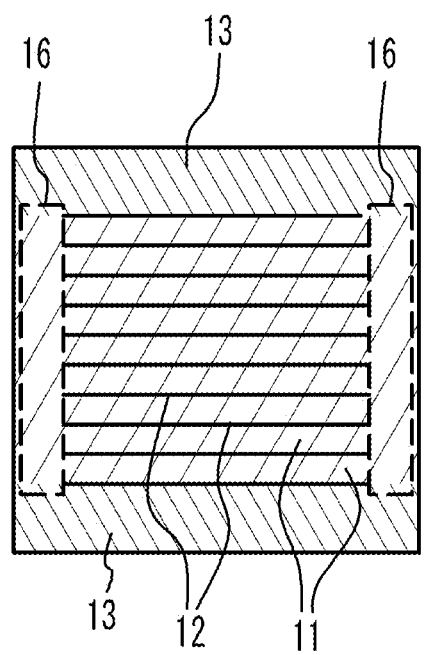
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a 0201 shape (a length of 0.25 mm, a width of 0.125 mm, and a height of 0.125 mm). The multilayer ceramic capacitor 100 may have a 0402 shape (a length of 0.4 mm, a width of 0.2 mm, and a height of 0.2 mm). The multilayer ceramic capacitor 100 may have a 0603 shape (a length of 0.6 mm, a width of 0.3 mm, and a height of 0.3 mm). The multilayer ceramic capacitor 100 may have a 1005 shape (a length of 1.0 mm, a width of 0.5 mm, and a height of 0.5 mm). The multilayer ceramic capacitor 100 may have a 3216 shape (a length of 3.2 mm, a width of 1.6 mm, and a height of 1.6 mm). The multilayer ceramic capacitor 100 may have a 4532 shape (a length of 4.5 mm, a width of 3.2 mm, and a height of 2.5 mm). However, the size of the multilayer ceramic capacitor 100 is not limited to the above sizes. The multilayer ceramic capacitor 100 may have a size which is larger than the 0201 shape and smaller than the 0402 shape.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. The thickness of each of the internal electrode layers 12 may be 0.2 μm or more and 0.8 μm or less, 0.8 μm or more and 1.5 μm or less, or 1.5 μm or more and 4.0 μm or less. The thickness of each of the internal electrode layers 12 may be an average of thicknesses of 10 different points in an image captured by a microscope such as a scanning transmission electronic microscope after obtaining a cross section of FIG. 2 by mechanically polishing the multilayer ceramic capacitor 100.

A main component of the dielectric layers 11 is a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}O_3$ ($0 \leq x \leq 1$, $0 \leq y \leq 1$, $0 \leq z \leq 1$) having a perovskite structure. $Ba_{1-x-y}Ca_xSr_yTi_{1-z}O_3$ may be barium strontium titanate, barium calcium titanate, calcium zirconate, calcium titanate zirconate, barium calcium titanate zirconate or the like. The thickness of each of the dielectric layers 11 may be 0.2 μm or more and 0.4 μm or less, 0.4 μm or more and 1.0 μm or less, or 1.0 μm or more and 10 μm or less. The thickness of each of the dielectric layers 11 may be an average of thicknesses of 10 different points in an image captured by a microscope such as a scanning transmission electronic microscope after obtaining a cross section of FIG. 2 by mechanically polishing the multilayer ceramic capacitor 100.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

Figure 4A:
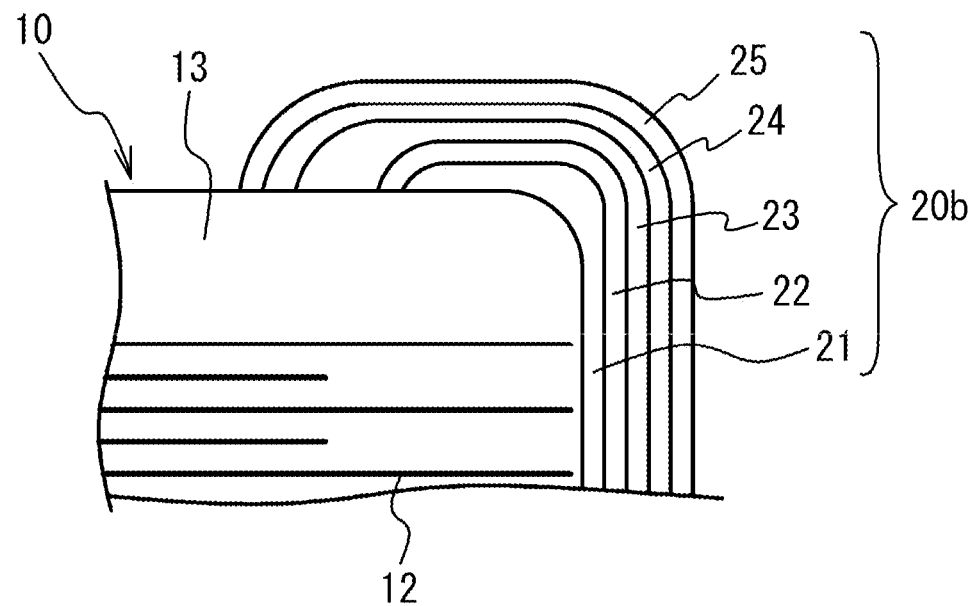
FIG. 4A and FIG. 4B illustrate a cross sectional view of an external electrode.

FIG. 4A illustrates a cross sectional view of the external electrode 20b and is a partial cross sectional view taken along a line A-A of FIG. 1. In FIG. 4A, hatching for cross section is omitted. As illustrated in FIG. 4A, the external electrode 20b has a structure in which a first plated layer 22 such as Cu, a conductive resin layer 23, a second plated layer 24 such as Ni and a third plated layer 25 such as Sn are formed on a base layer 21 in this order. The base layer 21, the first plated layer 22, the conductive resin layer 23, the second plated layer 24 and the third plated layer 25 extend toward the four side faces from the both end faces of the multilayer chip 10.

A main component of the base layer 21 is a metal such as Cu, Ni, Al (aluminum) or Zn (zinc). The base layer 21 includes a glass component for densifying the base layer 21 or a co-material for controlling sinterability of the base layer 21. The base layer 21 including these ceramic components has high adhesiveness with the cover layer 13 whose main component is a ceramic material. The conductive resin layer 23 is a resin layer including a metal component such as Ag. The conductive resin layer 23 is flexible. Therefore, the conductive resin layer 23 suppresses stress caused by deflection of a substrate on which the multilayer ceramic capacitor 100 is mounted. The first plated layer 22 is provided in order to increase adhesiveness between the base layer 21 and the conductive resin layer 23. The external electrode 20a has the same structure as the external electrode 20b.

Figure 4B:
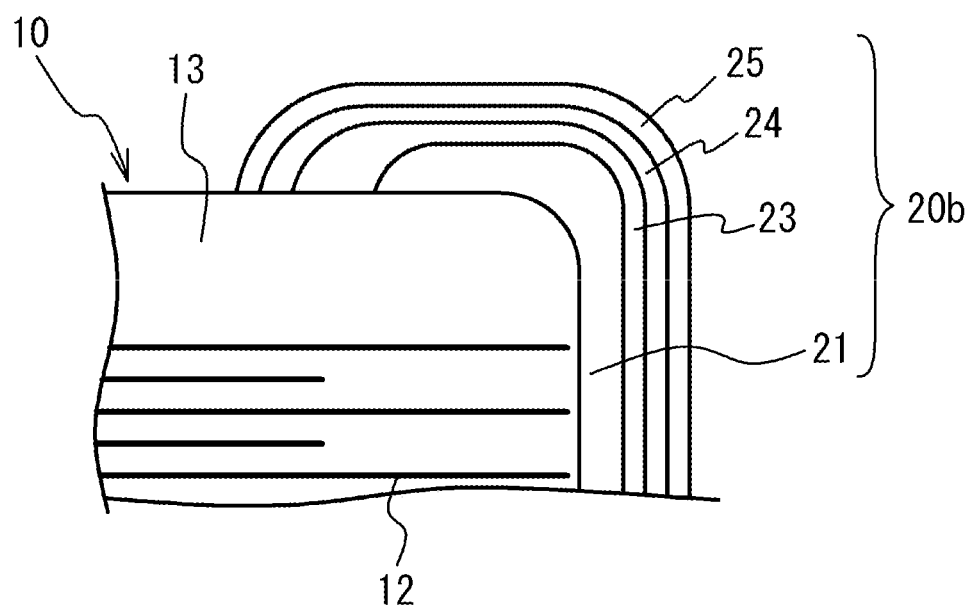

As illustrated in FIG. 4B, the first plated layer 22 may not be necessarily provided. The conductive resin layer 23 may not be necessarily provided.

In the embodiment, the perovskite structure expressed by a general formula $ABO_3$ includes $ABO_{3-\alpha}$ having an off-stoichiometric composition. An A site and a B site independent sites which are crystallographically occupied. When the perovskite structure is barium titanate, barium occupies the A site and titanium occupies the B site. At least one of crystal grains of the dielectric layers 11 has a core-shell structure.

Figure 5A:
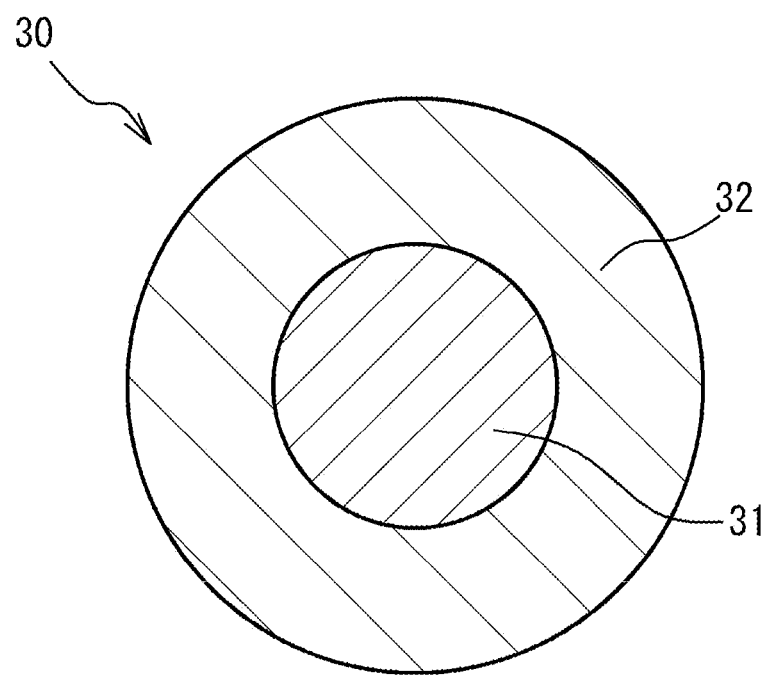
FIG. 5A illustrates a core-shell structure.

As illustrated in FIG. 5A, a core-shell grain 30 has a core 31 having a spherical shape and a shell 32 covering and surrounding the core 31. The core 31 is a crystal portion in which no additive compound is solid-solved or an amount of solid-solved additive compound is small. The shell 32 is a crystal portion in which an additive compound is solid-solved. And a concentration of an additive compound of the shell 32 is higher than that of the core 31.

Figure 5B:
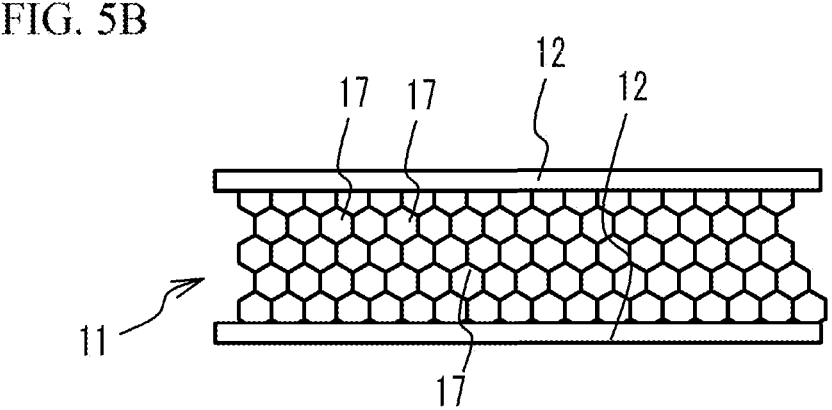
FIG. 5B schematically illustrates a cross section of a dielectric layer.

FIG. 5B schematically illustrates a cross section of the dielectric layer 11. As illustrated in FIG. 5B, the dielectric layer 11 includes a plurality of crystal grains 17 of the main component ceramic. At least a part of the crystal grains 17 is the core shell grain 30 described on the basis of FIG. 5A.

It is thought that a lifetime of the multilayer ceramic capacitor 100 is determined by the diffusion of oxygen vacancies in the main component ceramic of the dielectric layers 11 and accumulation of the oxygen vacancies. In particular, it is predicted that a concentration of the oxygen vacancies is high after a weak oxidizing process, in the core 31 in which the concentration of the additive element is small. It is thought that when the diffusion of the oxygen vacancies from the core 31 is suppressed, the lifetime of the multilayer ceramic capacitor 100 is improved. In the embodiment, when the crystal grains of the ceramic of the dielectric layers 11 have the core-shell structure and the dispersion of the atomic displacement amount between the B site atoms and oxygen atoms in the shell 32 is large, at least one of the atomic displacement amounts is large. In the location where the atomic displacement amount is large, the movement of the oxygen atoms among lattice positions is suppressed. Therefore, the movement of the oxygen vacancy is suppressed. When the diffusion of the oxygen vacancy is suppressed in the shell 32, the diffusion of the oxygen vacancies from the core 31 and the diffusion of the oxygen vacancies between crystal grains covered by the shell 32 are suppressed. Therefore, the lifetime of the multilayer ceramic capacitor 100 is improved. Accordingly, it is possible to achieve long lifetime even if a re-oxidation process is performed in a strong reductive atmosphere.

In concrete, the dispersion of the atomic displacement amount between the B site atoms and the oxygen atoms in the shell 32 is larger than the dispersion of the atomic displacement amount between the B site atoms and the oxygen atoms in the core 31. When each atomic displacement amount is simply large, piezoelectricity of the dielectric material is large and sound noise may occur. Accordingly, in the embodiment, the dispersion of the atomic displacement is focused on. And, there are locations where the atomic displacement amount is larger and locations where the atomic displacement amount is smaller.

For example, the dispersion of the atomic displacement amount between the B site atoms and the oxygen atoms is calculated from locations of the B site atoms and locations of the oxygen atoms in an image of an aberration corrected annular bright-field scanning transmission electron microscope (Cs-corrected ABF-STEM). For example, the multilayer ceramic capacitor 100 is thinned to a thickness of 40 nm or less by an ion milling device. After that, a damaged layer of a surface is removed by a low acceleration voltage ion milling device. An image of the thinned sample is captured by the Cs-corrected ABF-STEM. In this case, in order to determine locations of atoms, an image is obtained so as to include 200 or more of the B site atoms with a resolution of 0.01 nm or less per one pixel. For example, when JEM-ARM 200F NEOARM made by JEOL LTD. is used, it is possible to satisfy the condition with the resolution of 1024×1024 with a magnification of 20M. In this case, the resolution is 0.0083 nm/pix. 394 of the B site atoms are included.

Figure 6:
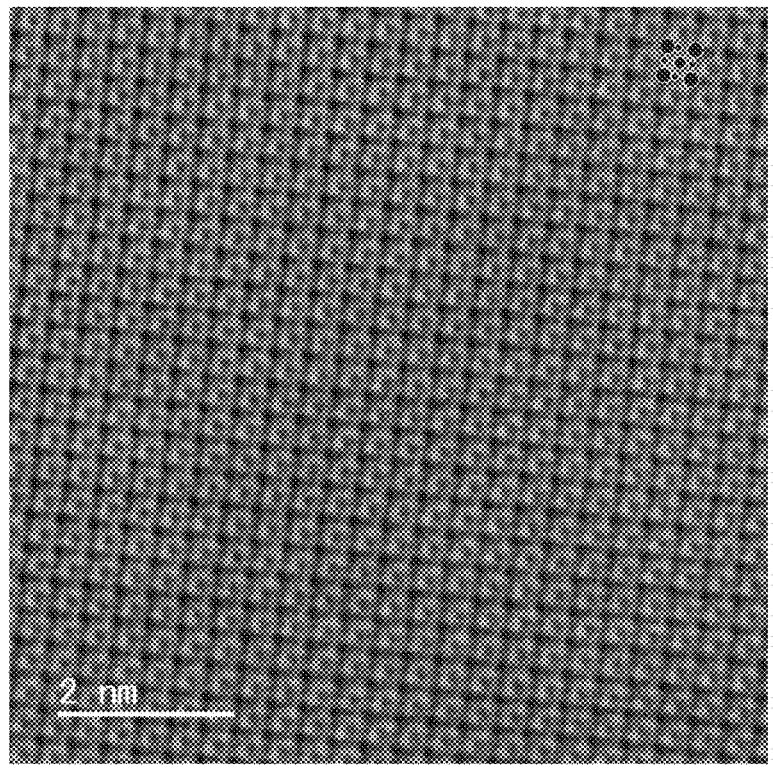
FIG. 6 illustrates a Cs-corrected ABF-STEM image obtained from a shell.

FIG. 6 illustrates a Cs-corrected ABF-STEM image which is actually obtained from the shell 32. A site atoms 41, B site atoms 42 and oxygen atoms 43 are confirmed.

In order to accurately determine the locations of the B site atoms 42 and the locations of the oxygen atom 43 in the obtained image, signal intensities of the A site atom 41, the B site atom 42 and the oxygen atom 43 in the image are fitted to two-dimensional Gaussian functions. Thus, the signal intensities and the locations of the atoms are refined. It is difficult to determine the location of the oxygen atom, because the signal intensity of the oxygen atom 43 is weak. Accordingly, the location of the oxygen atom is refined by the following method. At first, the signal intensity and the location of each of the A site atoms are refined. When the number of the A site atoms 41 is 100, 100 numbers of the two-dimensional Gaussian functions are prepared. And, the signal intensity and the location of each of the A site atoms 41 in the image are refined. In this case, the same number of the two-dimensional Gaussian function as the number of the A site atoms 41 are obtained. The signal intensities of the obtained two-dimensional Gaussian functions are subtracted from the image. Thus, an image without the signal intensities of the A site atoms 41 are obtained. From the obtained image, the signal intensities and the locations of the B site atoms 42 are refined. The refined signal intensities and the refined locations are subtracted. Finally, the signal intensities and the locations of the oxygen atoms 43 are refined in the resulting image. Thus, the locations of the oxygen atoms 43 are obtained. The procedure from capturing of the image to the refining is performed in a computer. The atomic displacement is calculated on the basis of the coordinate of the coordinate of the B site atom 42 and the coordinate of the oxygen atom 43.

Figure 7:
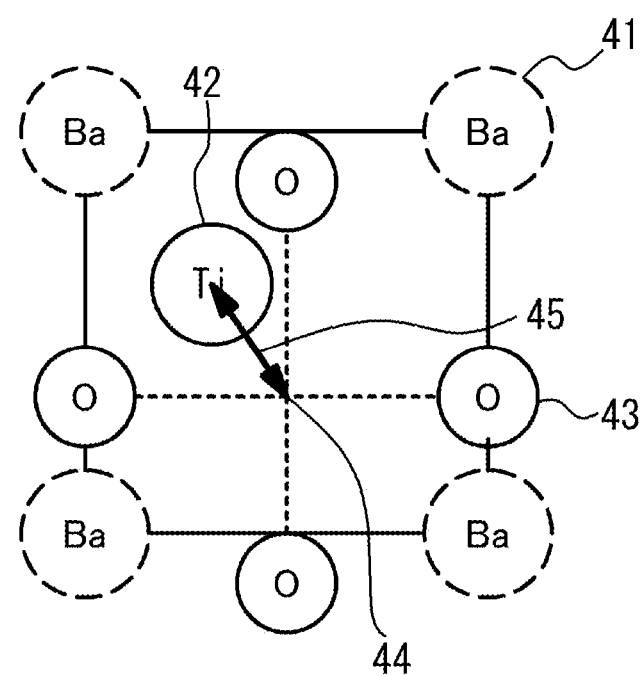
FIG. 7 illustrates a calculation example of an atomic displacement amount.

The atomic displacement amount can be calculated by a method illustrated in FIG. 7. The four oxygen atoms 43 which are the closest to the specific B site atom 42 in an image are determined. Next, a center of mass of the four oxygen atoms 43 is calculated. The coordinate position of the B site atom 42 is calculated. And the coordinate position of the center of mass of the four oxygen atoms 43 is calculated. A positional difference amount between the coordinate position of the center of mass of the four oxygen atoms 43 and the coordinate position of the B site atom 42 is defined as the atomic displacement amount 45 between the B site atom 42 and the oxygen atoms 43. Each atomic displacement amount 45 is calculated with respect to all of the B site atoms 42 in the image. A variance of the atomic displacement amounts 45 is calculated. The variance is defined as a variance between the B site atoms 42 and the oxygen atoms 43. The number of the data for calculating the variance of the atomic displacement amount 45 is 25 or more in a single image. When it is difficult to discriminate between the A site atoms 41 and the B site atoms 42 in the Cs-corrected ABF-STEM image, the A site atoms 41 and the B site atoms 42 may be discriminated from the image of an aberration corrected annular dark-field scanning transmission electron microscope or an image of an aberration corrected scanning transmission electron microscope-EDS element map. The signal intensity of the oxygen atom 43 is lower than those of the A site atom 41 and the B site atom 42. It is therefore possible to easily discriminate the oxygen atom 43.

For example, it is preferable that the variance of the atomic displacement amounts 45 between the B site atoms 42 and the oxygen atoms 43 of the shell 32 is 1.3 times or more of the variance of the atomic displacement amounts 45 of the B site atoms 42 and the oxygen atoms 43 of the core 31. It is more preferable that the variance of the atomic displacement amounts 45 between the B site atoms 42 and the oxygen atoms 43 of the shell 32 is 1.5 times or more of the variance of the atomic displacement amounts 45 of the B site atoms 42 and the oxygen atoms 43 of the core 31. It is still more preferable that the variance of the atomic displacement amounts 45 between the B site atoms 42 and the oxygen atoms 43 of the shell 32 is twice or more of the variance of the atomic displacement amounts 45 of the B site atoms 42 and the oxygen atoms 43 of the core 31.

In the image, an average of the atomic displacement amounts 45 between the B site atoms 42 and the oxygen atoms 43 of the shell 32 is, for example, 15 pm or more and 20 pm or less, 20 pm or more and 25 pm or less, or 25 pm or more and 30 pm or less. In the image, an average of the atomic displacement amounts 45 between the B site atoms 42 and the oxygen atoms 43 of the core 31 is, for example, 10 pm or more and 15 pm or less, 15 pm or more and 20 pm or less, or 20 pm or more and 25 pm or less.

In the image, the variance of the atomic displacement amounts 45 between the B site atoms 42 and the oxygen atoms 43 of the shell 32 is, for example, 9 pm$^2$ or more and 15 pm$^2$ or less, 15 pm$^2$ or more and 25 pm$^2$ or less, or 25 pm$^2$ or more and 40 pm$^2$ or less. In the image, the variance of the atomic displacement amounts 45 between the B site atoms 42 and the oxygen atoms 43 of the core 31 is, for example, 5 pm$^2$ or more and 8 pm$^2$ or less, 8 pm$^2$ or more and 12 pm$^2$ or less, or 12 pm$^2$ or more and 16 pm$^2$ or less.

When an average crystal grain diameter of the crystal grains 17 in the dielectric layers 11 is large, the number of the core-shell grains 30 existing between two of the internal electrode layers 12 becomes small. In this case the reliability of the multilayer ceramic capacitor 100 may be degraded. Accordingly, the average crystal grain diameter of the crystal grains 17 has an upper limit. For example, it is preferable that the average crystal grain diameter of the crystal grains 17 is 200 nm or less. It is more preferable that the average crystal grain diameter of the crystal grains 17 is 180 nm or less. It is still more preferable that the average crystal grain diameter of the crystal grains 17 is 150 nm or less.

When the average crystal grain diameter of the crystal grains 17 in the dielectric layers 11 is small, the dielectric constant of the dielectric layers 11 may be degraded. Alternatively, the core-shell structure may not be necessarily formed, and desirable performance may not be necessarily achieved. Accordingly, the average crystal grain diameter of the crystal grains 17 has a lower limit. For example, it is preferable that the average crystal grain diameter of the crystal grains 17 is 80 nm or more. It is more preferable that the average crystal grain diameter of the crystal grains 17 is 100 nm or more. It is still more preferable that the average crystal grain diameter of the crystal grains 17 is 120 nm or more. The crystal grain diameter of the crystal grain can be measured when a cross section of the multilayer ceramic capacitor is formed by a mechanical polishing and a chemical mechanical polishing, and an average of longitudinal diameters of 20 grains in an image captured by a microscope such as a scanning transmission electron microscopy is calculated.

Figure 8:
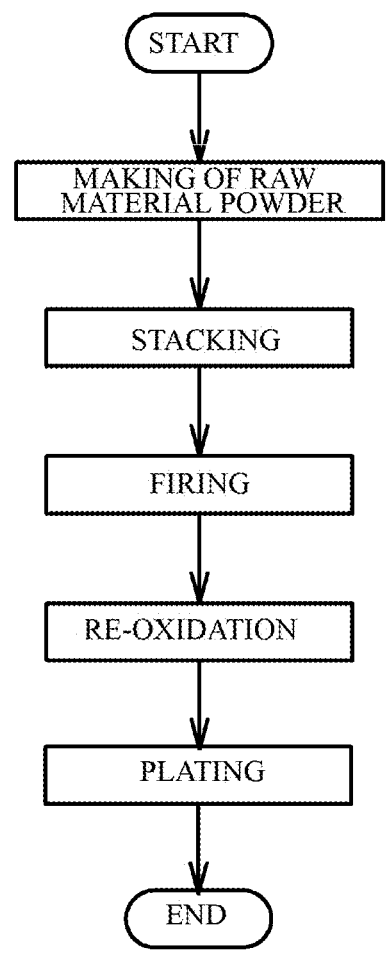
FIG. 8 is a flowchart of a method of manufacturing a multilayer ceramic capacitor.

Next, the manufacturing method of the multilayer ceramic capacitor 100 will be described. FIG. 8 is a flowchart of the manufacturing method of the multilayer ceramic capacitor 100.

[Making of Raw Material Powder]

A dielectric material for forming the dielectric layer 11 is prepared. The A site element and the B site element contained in the dielectric layer 11 are contained in the dielectric layer 11 typically in the form of a sintered compact of ABO$_3$ particles. For example, BaTiO$_3$ is a tetragonal compound having a perovskite structure, and exhibits high dielectric constant. This BaTiO$_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

The resulting ceramic raw material powder is subjected to a ball milling treatment in acetic acid aqueous solution. After that, the resulting ceramic raw material powder is washed by pure water. By the method, dislocation caused by the ball milling is fixed until a high temperature because of hydrogen/Ba vacancy caused by the acid. Dislocation of the oxygen atom occurs from the distortion around the dislocation. The effect is not achieved by only stirring of the powder in acid aqueous solution and the ball milling in neutral aqueous solution. The effect is achieved when the chemical defect caused by the acid aqueous solution (entering hydrogen atom or solid-solved hydrogen is includes) and the physical energy caused by the ball milling are combined. In particular, the acidity of the acetic acid aqueous solution is weaker than strong acid such as hydrochloric acid, sulfuric acid, nitric acid or the like. It is therefore possible to easily control the process. When the strong acid is used, the barium titanate may be dissolved in addition of occurrence of the vacancy. In addition, when the acetic acid is used, chlorine, sulfur, ammonia or the like is not formed from the residue which is left by the treatment using the hydrochloric acid, the sulfuric acid, or the nitric acid. It is therefore possible to suppress the degradation of the multilayer ceramic capacitor and suppress deterioration of an electric furnace used for sintering.

Additive compound is added to the resulting ceramic powder in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium), or Yb (ytterbium)) or an oxide of Co (cobalt), Ni, Li (lithium), B (boron), Na (sodium), K (potassium) or Si (silicon), or glass.

For example, a compound including an additive is wet-blended with the resulting ceramic material powder. The resulting ceramic material powder is dried and crushed. For example, the resulting ceramic material is crushed if necessary. Thus, a particle diameter is adjusted. Alternatively, the particle diameter may be further adjusted by a classification process. Thus, a dielectric material is obtained.

[Stacking Process]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of, for example, 0.5 μm or more is painted on a base material by, for example, a die coater method or a doctor blade method, and then dried.

Next, an internal electrode layer pattern is formed on the surface of the dielectric green sheet by printing a metal conductive paste for forming the internal electrode with use of screen printing or gravure printing. The metal conductive paste for forming the internal electrode contains an organic binder. A plurality of internal electrode layer patterns are alternately exposed to a pair of external electrodes. Ceramic particles are added as a co-material to the metal conductive paste. The main component of the ceramic particles is not particularly limited, but is preferably the same as the main component ceramic of the dielectric layer 11. For example, $BaTiO_3$ of which an average grain diameter is 50 nm or less may be evenly dispersed.

After that, the dielectric green sheet on which the internal electrode layer pattern is printed is stamped into a predetermined size, and a predetermined number (for example, 100 to 1000) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets to be the cover layers 13 are clamped on the upper face and the lower face of the stacked dielectric green sheets in the stacking direction. And, the resulting multilayer structure is cut into a predetermined chip size (for example, 1.0 mm×0.5 mm).

[Firing Process]

the binder is removed from the resulting ceramic multilayer structure in $N_2$ atmosphere. After that, metal paste to be the base layer of the external electrodes 20a and 20b is painted by a dipping method. The resulting ceramic multilayer structure is fired in a reducing atmosphere with an oxygen partial pressure of $10^{-12}$ to $10^{-9}$ MPa in a temperature range of 1160° C. to 1280° C. for 5 minutes to 10 minutes.

[Re-oxidation Process]

In order to return the oxygen into the barium titanate acting as the main phase of the dielectric layers 11 which are fired in the reductive atmosphere and is partially reduced, a thermal process may be performed in a mixed gas of $N_2$ and moisture at approximately 1000 degrees C. or in a normal atmosphere at 500 degrees C. to 700 degrees C. so that the internal electrode layers 12 are not oxidized. The process is called a re-oxidation process.

[Plating Process]

After that, metal layers such as Cu, Ni, Sn or the like may be formed on the base layers of the external electrodes 20a and 20b by plating. When the multilayer ceramic capacitor 100 has the structure of FIG. 4A, the conductive resin layer 23 is formed. With the processes, the multilayer ceramic capacitor 100 is fabricated.

In the manufacturing method of the embodiment, the treatment of the ceramic raw material powder is adjusted so that the dispersion of the atomic displacement amount between the B site atoms and the oxygen atoms in the shell 32 is larger than the dispersion of the atomic displacement amount between the B site atoms and the oxygen atoms in the core 31. For example, the concentration of the acetic acid of the acetic acid aqueous solution, the temperature of the acetic acid aqueous solution, the time of the treatment using the acetic acid, or the like. Alternatively, the size of the Zr ball used for the ball milling, the time of the ball milling or the like.

Second Embodiment

In a second embodiment, when the crystal grains of the ceramic of the dielectric layers 11 have the core-shell structure and a direction of the atomic displacement between the B site atoms 42 and the oxygen atoms 43 of the shell 32 is different from a direction of the atomic displacement between the B site atoms 42 and the oxygen atoms 43, the diffusion of the oxygen vacancies of the core 31 into the shell 32 is suppressed. Therefore, the movement of the oxygen vacancy is suppressed. When the diffusion of the oxygen vacancy is suppressed in the shell 32, the diffusion of the oxygen vacancies from the core 31 and the diffusion of the oxygen vacancies between crystal grains covered by the shell 32 are suppressed. Therefore, the lifetime of the multilayer ceramic capacitor 100 determined by the diffusion and the accumulation of the oxygen vacancy is improved. Accordingly, it is possible to achieve long lifetime even if a re-oxidation process is performed in a strong reductive atmosphere.

For example, the direction of the atomic displacement between the B site atoms 42 and the oxygen atoms 43 is calculated from locations of the A site atoms 41, locations of the B site atoms and locations of the oxygen atoms 43 in an image of an aberration corrected annular bright-field scanning transmission electron microscope (Cs-corrected ABF-STEM). For example, the multilayer ceramic capacitor 100 is thinned to a thickness of 40 nm or less by an ion milling device. After that, a damaged layer of a surface is removed by a low acceleration voltage ion milling device. An image of the thinned sample is captured by the Cs-corrected ABF-STEM. In this case, in order to determine locations of atoms, an image is obtained so as to include 200 or more of the B site atoms with a resolution of 0.01 nm or less per one pixel. For example, when JEM-ARM 200F NEOARM made by JEOL LTD. is used, it is possible to satisfy the condition with the resolution of 1024×1024 with a magnification of 20M. In this case, the resolution is 0.0083 nm/pix. 394 of the B site atoms are included.

In order to accurately determine the locations of the A site atoms 41, the locations of the B site atoms 42 and the locations of the oxygen atom 43 in the obtained image, signal intensities of the A site atom 41, the B site atom 42 and the oxygen atom 43 in the image are fitted to two-dimensional Gaussian functions. Thus, the signal intensities and the locations of the atoms are refined. It is difficult to determine the location of the oxygen atom, because the signal intensity of the oxygen atom 43 is weak. Accordingly, the location of the oxygen atom is refined by the following method. At first, the signal intensity and the location of each of the A site atoms are refined. When the number of the A site atoms 41 is 100, 100 numbers of the two-dimensional Gaussian functions are prepared. And, the signal intensity and the location of each of the A site atoms 41 in the image are refined. In this case, the same number of the two-dimensional Gaussian function as the number of the A site atoms 41 are obtained. The signal intensities of the obtained two-dimensional Gaussian functions are subtracted from the image. Thus, an image without the signal intensities of the A site atoms 41 are obtained. From the obtained image, the signal intensities and the locations of the B site atoms 42 are refined. The refined signal intensities and the refined locations are subtracted. Finally, the signal intensities and the locations of the oxygen atoms 43 are refined in the resulting image. Thus, the locations of the oxygen atoms 43 are obtained. The procedure from capturing of the image to the refining is performed in a computer. The atomic displacement is calculated on the basis of the coordinate of the coordinate of the B site atom 42 and the coordinate of the oxygen atom 43.

Figure 9:
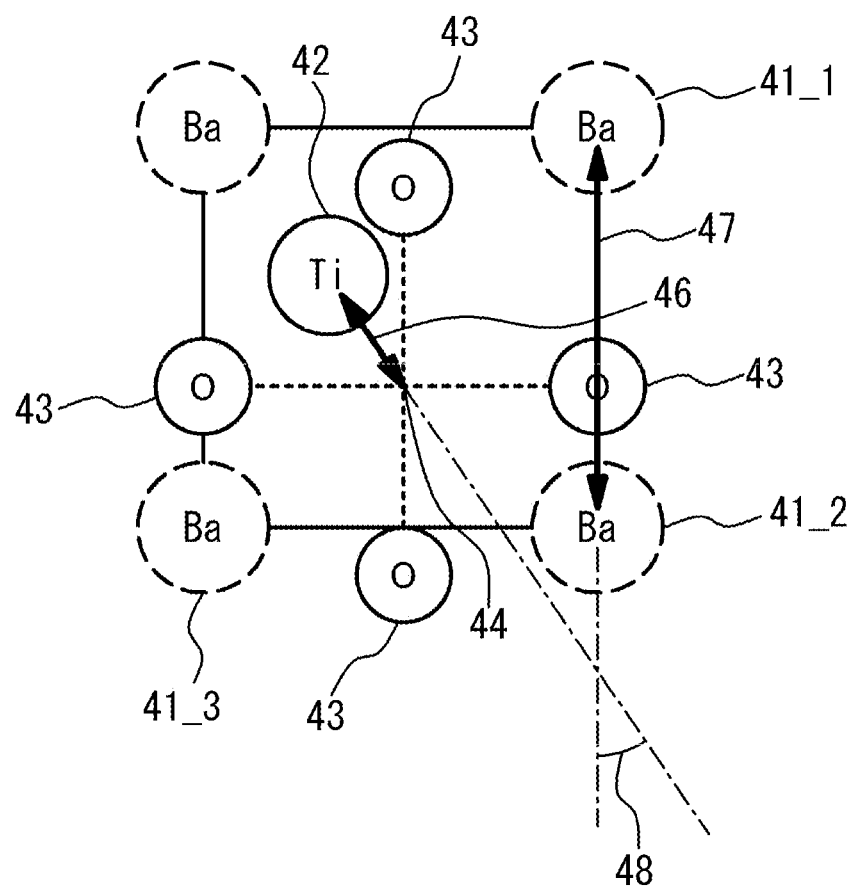
FIG. 9 illustrates a calculation example of a direction of atomic displacement amount.
Figure 10:
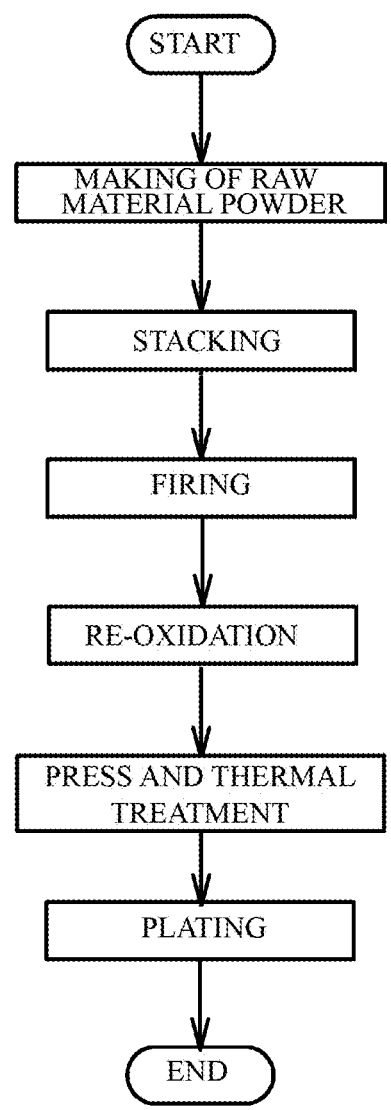
FIG. 10 is a flowchart of a method of manufacturing a multilayer ceramic capacitor.

For example, the direction of the atomic displacement can be calculated with a method illustrated in FIG. 9. The four oxygen atoms 43 which are the closest to the specific B site atom 42 in an image. Next, a center of mass 44 of the four oxygen atoms 43 is calculated. Then, a vector of a line segment between the coordinate of the position of the B site atom 42 and the center of mass of the four oxygen atoms 43 is calculated. The vector is referred to as a BO vector 46. Next, a vector which is a standard of the direction of the BO vector 46 is calculated. The three A site atoms 41 which surround the B site atom 42 and are next to each other are selected. The three A site atoms 41 are referred to as an A site atoms 41_1 (first A site atom), an A site atom 41_2 (second A site atom) and an A site atom 41_3 (third A site atom). A vector of a line segment connecting between the A site atom 41_1 and the A site atom 41_2 and a vector of a line segment connecting between the A site atom 41_2 and the A site atom 41_3 are calculated. One of the two calculated vectors is selected. The selected vector is referred to as an AA vector 47. Anyone can be selected from the two calculated vectors. For example, vectors which have a common direction between the core 31 and the shell 32 may be selected. An angle 48 between the BO vector 46 and the AA vector 47 is calculated. The angle 48 is defined as the direction of atomic displacement between the B site atom 42 and the oxygen atoms 43. All of the directions of the atomic displacement are calculated with respect to all of the B site atoms 42 in the image. An average of the directions is defined as the direction of atomic displacement between the B site atom 42 and the oxygen atoms 43. Next, a standard deviation of the directions of atomic displacement of the B site atoms 42 is calculated, with respect to each of the core 31 and the shell 32. A square root of square-sum of the standard deviation of the core 31 and the standard deviation of the shell 32 is defined as a synthetic standard deviation of the directions of the atomic displacement. When a difference between the direction of the atomic displacement of the core 31 and the direction of the atomic displacement of the shell 32 is twice or more of the synthetic standard deviation, it is defined as that the direction of the atomic displacement between the B site atom 42 and the oxygen atoms 43 of the shell 32 is different from the direction of the atomic displacement between the B site atom 42 and the oxygen atoms 43 of the core 31. When it is difficult to discriminate between the A site atoms 41 and the B site atoms 42 in the Cs-corrected ABF-STEM image, the A site atoms 41 and the B site atoms 42 may be discriminated from the image of an aberration corrected annular dark-field scanning transmission electron microscope or an image of an aberration corrected scanning transmission electron microscope-EDS element map. The signal intensity of the oxygen atom 43 is lower than those of the A site atom 41 and the B site atom 42. It is therefore possible to easily discriminate the oxygen atom 43.

From a viewpoint of suppressing the diffusion of oxygen vacancy in the shell 32, it is preferable that a difference of the direction of the atomic displacement between the B site atom 42 and the oxygen atoms 43 of the shell 32 and the direction of the atomic displacement between the B site atom 42 and the oxygen atoms 43 of the core 31 in the image is 30 degrees or more. It is more preferable that the difference is 40 degrees or more. It is still more preferable that the difference is 44 degrees or more.

From a viewpoint of dielectric polarization of materials, it is preferable that the difference of the direction of the atomic displacement between the B site atom 42 and the oxygen atoms 43 of the shell 32 and the direction of the atomic displacement between the B site atom 42 and the oxygen atoms 43 of the core 31 in the image is 60 degrees or less. It is more preferable that the difference is 50 degrees or less. It is still more preferable that the difference is 46 degrees or less.

The direction of the atomic displacement between the B site atom 42 and the oxygen atoms 43 of the shell 32 in the image is, for example, 30 degrees or more and 90 degrees or less, 40 degrees or more and 80 degrees or less, or 45 degrees or more and 60 degrees or less. The direction of the atomic displacement between the B site atom 42 and the oxygen atoms 43 of the core 31 in the image is 0 degrees or more and 30 degrees or less, 10 degrees or more and 27 degrees or less, or 15 degrees or more and 20 degrees or less.

When the average crystal grain diameter of the crystal grains 17 in the dielectric layers 11 is large, the number of the core-shell grains 30 existing between two of the internal electrode layers 12 becomes small. In this case, the reliability of the multilayer ceramic capacitor 100 may be degraded. Accordingly, the average crystal grain diameter of the crystal grains 17 has an upper limit. For example, it is preferable that the average crystal grain diameter of the crystal grains 17 is 200 nm or less. It is more preferable that the average crystal grain diameter of the crystal grains 17 is 180 nm or less. It is still more preferable that the average crystal grain diameter of the crystal grains 17 is 150 nm or less.

When the average crystal grain diameter of the crystal grains 17 in the dielectric layers 11 is small, the dielectric constant of the dielectric layers 11 may be degraded. Alternatively, the core-shell structure may not be necessarily formed, and desirable performance may not be necessarily achieved. Accordingly, the average crystal grain diameter of the crystal grains 17 has a lower limit. For example, it is preferable that the average crystal grain diameter of the crystal grains 17 is 80 nm or more. It is more preferable that the average crystal grain diameter of the crystal grains 17 is 100 nm or more. It is still more preferable that the average crystal grain diameter of the crystal grains 17 is 120 nm or more. The crystal grain diameter of the crystal grain can be measured when a cross section of the multilayer ceramic capacitor is formed by a mechanical polishing and a chemical mechanical polishing, and an average of longitudinal diameters of 20 grains in an image captured by a microscope such as a scanning transmission electron microscopy.

The structure of the embodiment can be obtained by performing a pressurized thermal treatment between the re-oxidation process and the plating process of the manufacturing method of FIG. 8. For example, the temperature of the sintered body is elevated to 1000° C. by a hot press in the same atmosphere as the re-oxidation process. The resulting sintered body is pressurized at 100 MPa for two hours. The temperature of the resulting body is decreased to a room temperature. After that, the applied pressure is removed. With the method, atoms diffuse at the high temperature. The positions of the atoms are fixed during decreasing of the temperature. When the applied pressure is removed from the fixed pressurized structure is removed, distortion occurs in the dielectric layers 11. The distortion causes a stress in the crystal of the shell 32. Thereby, the direction of the atomic displacement between the B site atom 42 and the oxygen atoms 43 changes. In the embodiment, the treatment using the acetic acid may be omitted.

EXAMPLES

The multilayer ceramic capacitors in accordance with the first embodiment were made. And, property of the multilayer ceramic capacitors was measured.

Example 1

As the raw material powder of the dielectric material, the barium titanate powder having a surface in which lattice defect occurred in advance by acetic acid aqueous solution was used. In concrete, the raw material powder was treated by a ball milling at 80° C. with use of a Zr ball having a diameter of 3 mm and having a weight which was twice as powder weight, in acetic acid aqueous solution of which the concentration of the acetic acid was 0.2 mol %, for one hour.

After that, the resulting raw material powder was washed three times by pure water. The temperature during the ball milling was elevated by applying a heat gun. The temperature was kept at an adequate temperature by monitoring the temperature with use of a contactless thermometer. The resulting raw material powder was mixed with additives including powder of $BaCO_3$, $Ho_2O_3$, $MnCO_3$, $MgO$ and $SiO_2$ in a pot mill. Binder was kneaded with the resulting raw material powder. Thus, paste was obtained. The paste was applied on a PET film. Thus, dielectric green sheets were formed. The dielectric green sheet on which an internal electrode pattern having Ni as a main component metal was printed were stacked and crimped. After that, external electrodes were applied. The resulting multilayer structure was fired. The fired structure was applied to the thermal treatment. Thus, multilayer ceramic capacitors were manufactured.

Example 2

In an example 2, the concentration of the acetic acid in the acetic acid aqueous solution was 0.1 mol %. Other conditions were the same as those of the example 1.

Comparative Example 1

In a comparative example 1, the treatment of the barium titanate in the acetic acid aqueous solution was not performed. Other conditions were the same as those of the example 1.

With respect to each of the multilayer ceramic capacitors of the examples 1 and 2 and the comparative example 1, the dispersion of the atomic displacement amount between the B site atoms and the oxygen atoms of the core and the dispersion of the atomic displacement amount of the shell in the core-shell grain in the dielectric layers were measured. The dispersions were calculated from locations of the B site atoms and locations of the oxygen atoms in the image of the aberration corrected annular bright-field scanning transmission electron microscope (Cs-corrected ABF-STEM). In concrete, the multilayer ceramic capacitors were thinned to a thickness of 40 nm or less by an ion milling device. After that, a damaged layer of a surface was removed by a low acceleration voltage ion milling device. Each image of the thinned samples was captured by the Cs-corrected ABF-STEM. In this case, in order to determine locations of atoms, the image was obtained so as to include 200 or more of the B site atoms with the resolution of 0.01 nm or less per one pixel. JEM-ARM 200F NEOARM made by JEOL LTD. was used. The condition was satisfied by capturing the image with the resolution of 1024×1024 with a magnification of 20M. In this case, the resolution was 0.0083 nm/pix. And, 394 of the B site atoms were included.

In order to accurately determine the locations of the B site atoms and the locations of the oxygen atom in the obtained image, signal intensities of the A site atom, the B site atom and the oxygen atom in the image were fitted to two-dimensional Gaussian functions. Thus, the signal intensities and the locations of the atoms were refined. At first, the signal intensity and the location of each of the A site atoms were refined. And, the signal intensity and the location of each of the A site atoms in the image were refined. In this case, the same number of the two-dimensional Gaussian function as the number of the A site atoms were obtained. The signal intensities of the obtained two-dimensional Gaussian functions were subtracted from the image. Thus, an image without the signal intensities of the A site atoms 41 were obtained. From the obtained image, the signal intensities and the locations of the B site atoms were refined. The refined signal intensities and the refined locations were subtracted from the image. Finally, the signal intensities and the locations of the oxygen atoms were refined in the resulting image. Thus, the locations of the oxygen atoms were obtained. The procedure from capturing of the image to the refining was performed in a computer. The atomic displacement is calculated on the basis of the coordinate of the coordinate of the B site atom and the coordinate of the oxygen atom. The atomic displacement was calculated by the method of FIG. 7.

Each lifetime of the multilayer ceramic capacitors of the examples 1 and 2 and the comparative example 1 was confirmed by a HALT test (Highly Accelerated Limit Test). In concrete, a mean time to failure (MTTF) was measured with respect to 30 numbers of multilayer ceramic capacitors under a condition of continuously applying DC 100V (50V/μm) at 150 degrees C. When the MTTF of the 30 samples was less than 5000 minutes, it was determined that the 30 samples did not satisfy the desirable performance (NG). When the MTTF of the 30 samples was 5000 minutes or more, it was determined that the 30 samples satisfied the desirable performance (OK).

Table 1 shows the results. As shown in Table 1, the HALT tests of the examples 1 and 2 were determined as OK. It is thought that this was because the dispersion of the atomic displacement amount between the B site atoms and the oxygen atoms in the shell was larger than the dispersion of the atomic displacement amount between the B site atoms and the oxygen atoms in the core in the core-shell structure. In contrast, the HALT test of the comparative example 1 was determined as NG. It is thought that this was because the dispersion of the atomic displacement amount between the B site atoms and the oxygen atoms in the shell was not larger than the dispersion of the atomic displacement amount between the B site atoms and the oxygen atoms in the core in the core-shell structure.

resulting raw material powder. Thus, paste was obtained. The paste was applied on a PET film. Thus, dielectric green sheets were formed. The dielectric green sheet on which an internal electrode pattern having Ni as a main component metal was printed were stacked and crimped. After that, external electrodes were applied. The resulting multilayer structure was fired. The fired structure was applied to the thermal treatment. Thus, multilayer ceramic capacitors were manufactured. After the re-oxidation process, the temperature of the multilayer ceramic capacitors was elevated to 1000° C. by a hot press in the same atmosphere as the re-oxidation process. The resulting multilayer ceramic capacitors were pressurized at 100 MPa and were subjected to a thermal treatment for two hours. After that, the temperature of the multilayer ceramic capacitors were decreased to a room temperature. After that, the applied pressure was removed.

Example 4

In an example 4, $BaTiO_3$ powder having a surface in which lattice defect occurred in advance by acetic acid aqueous solution was used. And, the hot press treatment was performed. In concrete, the raw material powder was treated by a ball milling with use of a Zr ball having a diameter of 3 mm and having a weight which was twice as powder weight, in acetic acid aqueous solution of which the concentration of the acetic acid was 0.2 mol %, for one hour. The resulting raw material powder was mixed with additives including powder of $BaCO_3$, $Ho_2O_3$, $MnCO_3$, $MgO$ and $SiO_2$ in a pot mill. Binder was kneaded with the resulting raw material powder. Thus, paste was obtained. The paste was applied on a PET film. Thus, dielectric green sheets were formed. The dielectric green sheet on which an internal electrode pattern having Ni as a main component metal was printed were stacked and crimped. After that, external electrodes were applied. The resulting multilayer structure was fired. The fired structure was applied to the thermal treat-

TABLE 1

| | | ON THE BASIS OF B SITE ATOMS | | | | |
|---|---|---|---|---|---|---|
| | CONCENTRATION OF ACETIC ACID (mol %) | AVERAGE DISPLACEMENT AMOUNT OF OXYGEN ATOM (pm) CORE | AVERAGE DISPLACEMENT AMOUNT OF OXYGEN ATOM (pm) SHELL | DISPERSION OF DISPLACEMENT AMOUNT OF OXYGEN ATOM ($pm^2$) CORE | DISPERSION OF DISPLACEMENT AMOUNT OF OXYGEN ATOM ($pm^2$) SHELL | HALT TEST |
| EXAMPLE 1 | 0.2 | 34 | 28 | 14 | 27 | OK |
| EXAMPLE 2 | 0.1 | 34 | 29 | 15 | 21 | OK |
| COMPARATIVE EXAMPLE 1 | — | 35 | 31 | 14 | 14 | NG |

The multilayer ceramic capacitors in accordance with the first embodiment were made. And, property of the multilayer ceramic capacitors was measured.

Example 3

$BaTiO_3$ acting as raw material powder was mixed with additives including powder of $BaCO^3$, $Ho_2O_3$, $MnCO_3$, $MgO$ and $SiO_2$ in a pot mill. Binder was kneaded with the ment. Thus, multilayer ceramic capacitors were manufactured. After the re-oxidation process, the temperature of the multilayer ceramic capacitors was elevated to 1000° C. by a hot press in the same atmosphere as the re-oxidation process. The resulting multilayer ceramic capacitors were pressurized at 100 MPa and were subjected to a thermal treatment for two hours. After that, the temperature of the multilayer ceramic capacitors were decreased to a room temperature. After that, the applied pressure was removed.

Comparative Example 2

In a comparative example 2, the compression weight in the thermal treatment after the re-oxidation was 0 MPa. Therefore, the pressing was not performed. Other conditions were the same as those of the example 3.

With respect to the multilayer ceramic capacitors of the examples 3 and 4 and the comparative example 2, the direction of the atomic displacement between the B site atom and the oxygen atoms in the core of the core-shell in the dielectric layer was measured. And the direction of the atomic displacement between the B site atoms and the oxygen atoms in the shell of the core-shell in the dielectric layer was measured. The positions of the A site atoms, the positions of the B site atoms and the positions of the oxygen atoms were measured by the same method of the examples 1 and 2 and the comparative example 1. The direction of the atomic displacement was calculated as described in FIG. 9.

Table 2 shows the results. In the example 3, the treatment using the acetic acid was not performed. Therefore, the concentration of the acetic acid was 0 mol %. In the example 3, the direction (average value) of the atomic displacement between the B site atom and the oxygen atoms in the core was 19 degrees. The direction (average value) of the atomic displacement between the B site atom and the oxygen atoms in the shell was 59 degrees. The standard deviation of the directions of the atomic displacement of the core was 7 degrees. The standard deviation of the directions of the atomic displacement of the shell was 10 degrees. The synthetic standard deviation×2 was 24 degrees. The difference between the direction (average value) of the atomic displacement of the shell and the direction (average value) of the atomic displacement of the core was larger than the synthetic standard deviation×2. In the example 4, the direction (average value) of the atomic displacement between the B site atom and the oxygen atoms in the core was 26 degrees. The direction (average value) of the atomic displacement between the B site atom and the oxygen atoms in the shell was 78 degrees. The standard deviation of the directions of the atomic displacement of the core was 6 degrees. The standard deviation of the directions of the atomic displacement of the shell was 5 degrees. The synthetic standard deviation×2 was 16 degrees. The difference between the direction (average value) of the atomic displacement of the shell and the direction (average value) of the atomic displacement of the core was larger than the synthetic standard deviation×2. In the comparative example 2, the direction (average value) of the atomic displacement between the B site atom and the oxygen atoms in the core was 20 degrees. The direction (average value) of the atomic displacement between the B site atom and the oxygen atoms in the shell was 35 degrees. The standard deviation of the directions of the atomic displacement of the core was 7 degrees. The standard deviation of the directions of the atomic displacement of the shell was 5 degrees. The synthetic standard deviation×2 was 17 degrees. The difference between the direction (average value) of the atomic displacement of the shell and the direction (average value) of the atomic displacement of the core was not larger than the synthetic standard deviation×2.

TABLE 2

| | WEIGHT DURING THERMAL TREATMENT (MPa) | CONCENTRATION OF ACETIC ACID (mol %) | DIRECTION OF ATOMIC DISPLACEMENT (°) CORE | DIRECTION OF ATOMIC DISPLACEMENT (°) SHELL | STANDARD DEVIATION OF DIRECTION (°) CORE | STANDARD DEVIATION OF DIRECTION (°) SHELL | SYNTHETIC STANDARD DEVIATION × 2 (°) | DIFFERENCE OF DIRECTIONS (°) | HALT TEST |
|---|---|---|---|---|---|---|---|---|---|
| EXMPLE 3 | 100 | 0 | 19 | 59 | 7 | 10 | 24 | 40 | OK |
| EXAMPLE 4 | 100 | 0.2 | 26 | 78 | 6 | 5 | 16 | 52 | OK |
| COMPARATIVE EXAMPLE 2 | 0 | 0.0 | 20 | 35 | 7 | 5 | 17 | 15 | NG |

Each lifetime of the multilayer ceramic capacitors of the examples 3 and 4 and the comparative example 2 was confirmed by the HALT test as well as the examples 1 and 2 and the comparative example 1. Table 2 shows the results of the examples 3 and 4 and the comparative example 2. As show in Table 2, the HALT tests of the examples 3 and 4 were determined as OK. It is thought that this was because the difference between the direction (average value) of the atomic displacement in the shell and the direction (average value) of the atomic displacement in the core in the core-shell structure was larger than the synthetic standard deviation×2. In contrast, the HALT test of the comparative example 2 was determined as NG. It is thought that this was because the difference between the direction (average value) of the atomic displacement in the shell and the direction (average value) of the atomic displacement in the core in the core-shell structure was not larger than the synthetic standard deviation×2.

Although the embodiments of the present invention have been described in detail, it is to be understood that the various change, substitutions, and alterations could be made hereto without departing from the spirit and scope of the invention.

What is claimed is:
1. A ceramic electronic device comprising:
   a multilayer structure in which each of a plurality of dielectric layers and each of a plurality of internal electrode layers are alternately stacked, a main component of the plurality of dielectric layers being a ceramic having a perovskite structure expressed by a general formula $ABO_3$,
   wherein at least one of crystal grains of the plurality of dielectric layers has a core-shell structure,
   wherein a dispersion of atomic displacement amounts between B site atoms and oxygen atoms of a shell of the core-shell structure is larger than a dispersion of atomic displacement amounts between B site atoms and oxygen atoms of a core of the core-shell structure.

2. The ceramic electronic device as claimed in claim 1, wherein the atomic displacement amount is a distance between each position of the B site atoms and a center of mass of four oxygen atoms which are around the each position of the B site atoms and are closest to the each position of the B site atoms, in an atom coordinate which is refined by fitting each of signal intensities in an image captured by an aberration corrected annular bright-field scanning transmission electron microscope, to each of two-dimensional Gaussian functions.

3. The ceramic electronic device as claimed in claim 1, wherein the dispersion of the atomic displacement amounts between the B site atoms and the oxygen atoms of the shell is 1.3 times or more of the dispersion of the atomic displacement amounts between the B site atoms and the oxygen atoms of the core.

4. The ceramic electronic device as claimed in claim 1, wherein an average of the atomic displacement amounts between the B site atoms and the oxygen atoms of the shell is 15 pm or more and 30 pm or less.

5. The ceramic electronic device as claimed in claim 1, wherein an average of the atomic displacement amounts between the B site atoms and the oxygen atoms of the core is 10 pm or more and 25 pm or less.

6. The ceramic electronic device as claimed in claim 1, wherein the dispersion of the atomic displacement amounts between the B site atoms and the oxygen atoms of the shell is 9 $pm^2$ or more and 40 $pm^2$ or less.

7. The ceramic electronic device as claimed in claim 1, wherein the dispersion of the atomic displacement amounts between the B site atoms and the oxygen atoms of the core is 5 $pm^2$ or more and 16 $pm^2$ or less.

8. The ceramic electronic device as claimed in claim 1, wherein each thickness of the plurality of dielectric layers is 0.2 μm or more and 0.4 μm or less.

9. The ceramic electronic device as claimed in claim 1, wherein an average of crystal grain diameters of the plurality of dielectric layers is 80 nm or more and 200 nm or less.

10. The ceramic electronic device as claimed in claim 1, wherein each thickness of the plurality of internal electrode layers is 0.2 μm or more and 0.8 μm or less.

11. The ceramic electronic device as claimed in claim 1, wherein an external size of the ceramic electronic device is 0201 shape or more and 0402 shape or less.

12. The ceramic electronic device as claimed in claim 1, wherein the main component of the plurality of dielectric layers is at least one of barium titanate, strontium titanate, calcium titanate, magnesium titanate, barium strontium titanate, barium calcium titanate, calcium zirconate, barium zirconate, calcium titanate zirconate, or barium calcium titanate zirconate.

13. The ceramic electronic device as claimed in claim 1, wherein the main component of the plurality of dielectric layers is barium calcium titanate zirconate.

14. The ceramic electronic device as claimed in claim 1,
wherein the multilayer structure has a substantially rectangular parallelepiped shape,
wherein each of the plurality of internal electrode layers is exposed to at least one of two facing end faces of the rectangular parallelepiped shape,
wherein each of a pair of external electrodes is formed on each of the two facing end faces,
wherein the pair of external electrodes include a base layer and a plated layer,
wherein a main component of the base layer is Cu,
wherein the plated layer is formed on the base layer.

15. The ceramic electronic device as claimed in claim 1,
wherein the multilayer structure has a substantially rectangular parallelepiped shape,
wherein each of the plurality of internal electrode layers is exposed to at least one of two facing end faces of the rectangular parallelepiped shape,
wherein each of a pair of external electrodes is formed on each of the two facing end faces,
wherein the pair of external electrodes include a base layer and a plated layer,
wherein a main component of the base layer is Ni,
wherein the plated layer is formed on the base layer.

16. The ceramic electronic device as claimed in claim 14, wherein the pair of external electrodes include a conductive resin layer between the base layer and the plated layer.

17. A ceramic electronic device comprising:
a multilayer structure in which each of a plurality of dielectric layers and each of a plurality of internal electrode layers are alternately stacked, a main component of the plurality of dielectric layers being a ceramic having a perovskite structure expressed by a general formula $ABO_3$,
wherein at least one of crystal grains of the plurality of dielectric layers has a core-shell structure,
wherein a direction of atomic displacement between B site atoms and oxygen atoms of a shell of the core-shell structure is different from a direction of atomic displacement between B site atoms and oxygen atoms of a core of the core-shell structure.

18. The ceramic electronic device as claimed in claim 17, wherein the direction of atomic displacement is an average value of directions of atomic displacement of all B site atoms in an image captured by an aberration corrected annular bright-field scanning transmission electron microscope, when four oxygen atoms which are around each position of the all B site atoms and are closest to the each position of the all B site atoms in an atom coordinate which is refined by fitting each of signal intensities in the image to each of two-dimensional Gaussian functions, a vector of a line segment connecting a center of mass of the four oxygen atoms and a coordinate of the each position of the all B site atoms is selected and three A site atoms of a first A site atom, a second A site atom and a third A site atom which surround the each position of the all B site atoms and are next to each other are selected, a vector which has a common direction between the core and the shell is selected from a vector of a line segment connecting the first A site atom and the second A site atom and a vector of a line segment connecting the second A site atom and the third A site atom, and an angle between the vector which is selected and a vector of a line segment connecting the each position of the all B site atoms and the center of mass is defined as the direction of atomic displacement between the all B site atoms and the four oxygen atoms.

19. The ceramic electronic device as claimed in claim 17, wherein a square root of square-sum of a standard deviation of the directions of atomic displacement of the core and a standard deviation of the directions of atomic displacement of the shell is defined as a synthetic standard deviation, and
wherein when a difference between the direction of atomic displacement of the core and the direction of atomic displacement of the shell is twice or more of the synthetic standard deviation, it is defined as that the direction of atomic displacement of the shell is different from the direction of atomic displacement of the core.

20. The ceramic electronic device as claimed in claim 17, wherein a difference between the direction of the atomic displacement of the shell and the direction of the atomic displacement of the core is 30 degrees or more and 60 degrees or less.

21. The ceramic electronic device as claimed in claim 17, wherein the direction of atomic displacement of the shell is 30 degrees or more and 90 degrees or less.

22. The ceramic electronic device as claimed in claim 17, wherein the direction of atomic displacement of the core is 0 degree or more and 30 degrees or less.

23. The ceramic electronic device as claimed in claim 17, wherein each thickness of the plurality of dielectric layers is 0.2 μm or more and 0.4 μm or less.

24. The ceramic electronic device as claimed in claim 17, wherein an average of crystal grain diameters of the plurality of dielectric layers is 80 nm or more and 200 nm or less.

25. The ceramic electronic device as claimed in claim 17, wherein each thickness of the plurality of internal electrode layers is 0.2 μm or more and 0.8 μm or less.

26. The ceramic electronic device as claimed in claim 17, wherein an external size of the ceramic electronic device is 0201 shape or more and 0402 shape or less.

27. The ceramic electronic device as claimed in claim 17, wherein the main component of the plurality of dielectric layers is at least one of barium titanate, strontium titanate, calcium titanate, magnesium titanate, barium strontium titanate, barium calcium titanate, calcium zirconate, barium zirconate, calcium titanate zirconate, or barium calcium titanate zirconate.

28. The ceramic electronic device as claimed in claim 17, wherein the main component of the plurality of dielectric layers is barium calcium titanate zirconate.

29. The ceramic electronic device as claimed in claim 17,
wherein the multilayer structure has a substantially rectangular parallelepiped shape,
wherein each of the plurality of internal electrode layers is exposed to at least one of two facing end faces of the rectangular parallelepiped shape,
wherein each of a pair of external electrodes is formed on each of the two facing end faces,
wherein the pair of external electrodes include a base layer and a plated layer,
wherein a main component of the base layer is Cu,
wherein the plated layer is formed on the base layer.

30. The ceramic electronic device as claimed in claim 17,
wherein the multilayer structure has a substantially rectangular parallelepiped shape,
wherein each of the plurality of internal electrode layers is exposed to at least one of two facing end faces of the rectangular parallelepiped shape,
wherein each of a pair of external electrodes is formed on each of the two facing end faces,
wherein the pair of external electrodes include a base layer and a plated layer,
wherein a main component of the base layer is Ni,
wherein the plated layer is formed on the base layer.

31. The ceramic electronic device as claimed in claim 29, the pair of external electrodes include a conductive resin layer between the base layer and the plated layer.

32. A manufacturing method of a ceramic electronic device comprising:
forming a ceramic multilayer structure by stacking a plurality of stack units, each of which has a structure in which an internal electrode pattern is formed on a dielectric green sheet including ceramic raw material powder having a perovskite structure expressed by a general formula $ABO_3$, the ceramic raw material powder being subjected to a ball milling in acetic acid aqueous solution; and
firing the ceramic multilayer structure,
wherein a dispersion of atomic displacement amounts between B site atoms and oxygen atoms of a shell of a crystal grain having a core-shell structure included in a dielectric layer obtained from the dielectric green sheet is larger than a dispersion of atomic displacement amounts between B site atoms and oxygen atoms of a core of the core-shell structure.

33. A manufacturing method of a ceramic electronic device comprising:
forming a ceramic multilayer structure by stacking a plurality of stack units, each of which has a structure in which an internal electrode pattern is formed on a dielectric green sheet including ceramic raw material powder having a perovskite structure expressed by a general formula $ABO_3$, the ceramic raw material powder being subjected to a ball milling in acetic acid aqueous solution;
forming a fired structure by firing the ceramic multilayer structure; and
pressing the fired structure and performing a thermal treatment of the fired structure so that a direction of atomic displacement between B site atoms and oxygen atoms of a shell of a crystal grain having a core-shell structure included in a dielectric layer obtained from the dielectric green sheet is different from a direction of atomic displacement between B site atoms and oxygen atoms of a core of the core-shell structure.

* * * * *